United States Patent [19]

Arbes

[11] Patent Number: 4,780,908
[45] Date of Patent: Oct. 25, 1988

[54] METHOD AND APPARATUS FOR SIGNAL TRANSMISSION REGULATION IN DIFFERENTIAL PROTECTION

[75] Inventor: Jean Arbes, L'Hay les Roses, France

[73] Assignee: Enertec, Montrouge, France

[21] Appl. No.: 874,327

[22] Filed: Jun. 16, 1986

[30] Foreign Application Priority Data

Jun. 25, 1985 [FR] France ................. 85 09628

[51] Int. Cl.$^4$ .................. H04B 17/00; H04B 1/10
[52] U.S. Cl. ................................. 455/67; 455/50; 455/214
[58] Field of Search ............ 455/67, 213, 214, 50, 455/52; 371/22

[56] References Cited

U.S. PATENT DOCUMENTS

| | | | |
|---|---|---|---|
| 4,401,860 | 8/1983 | Walls | 455/67 |
| 4,491,968 | 1/1985 | Shimp et al. | 455/67 |
| 4,524,446 | 6/1985 | Sun et al. | 455/67 |
| 4,599,615 | 7/1986 | Umetsu | 455/67 |

Primary Examiner—Robert L. Griffin
Assistant Examiner—Curtis Kuntz
Attorney, Agent, or Firm—Dale Gaudier; Stephen A. Becker

[57] ABSTRACT

Method and apparatus for the regulation of a modulated signal transmitted from a transmitter (E) to a receiver (R) in a differential protection system for an electrical installation. The invention lies in the regulation of the frequency spectrum of the modulated received signal (SMR). The presence of a fault in the electrical installation in this spectrum of low frequency components is attributed to presence of noise bursts in transmission affecting the received signal (SMR).

8 Claims, 2 Drawing Sheets

METHOD AND APPARATUS FOR SIGNAL TRANSMISSION REGULATION IN DIFFERENTIAL PROTECTION

The present invention relates to a method and apparatus for the regulation of a signal transmitted from a transmitter to a receiver in a differential protection system for an electrical installation, the transmitted signal taking the form of a modulated signal resulting from frequency or pulse width modulation of a carrier wave by means of a signal representing required information to be transmitted, a method and apparatus in which the presence of transmission noise in the received signal is detected, in order to distinguish such noise from information, possibly carried by this signal, resulting to a possible fault in the protected installation.

It has long been known to monitor the good order of some electrical installations, high voltage lines, for example, by comparing one with another measurements of values of current and voltages at two ends of that installation.

Such protection techniques, known as 'differential', clearly require the relaying of information relating to each end of the line towards the other end, for its comparison with information relating to that other end.

Differential protection systems for high voltage lines generally employ telephone channels for this information exchange. However, the pass band of a telephone channel (300-3400 Hz) does not include the fundamental frequency of the signal to be transmitted (50-60 Hz), so that it is necessary to resort to a modulation technique for signal transmission.

The most widely used modulation methods are frequency and pulse width modulation.

The most frequently used means for telephone channel communication are co-axial cable and wireless.

Modulated signals using such means and methods of communication may be subject to interference, which arrives in particular as unidirectional burst noise and phase jumps affecting the transmitted signal.

Such noise, which is present in the received and demodulated signals may be interpreted as faults in the protected electrical installation and lead to untimely triggering of protection systems.

It is therefore important to identify the presence of transmission noise.

Two detection techniques are used at present.

The first relies on control of the change in duration of the half-cycle of the modulated received signal. If $T_N$ is the duration of the half-cycle of order N of the signal and $T_{N+1}$ the duration of the half-cycle of order N+1, the technique relies upon monitoring the relationship $R=(T_N-T_{N+1})/T_{N+1}$; in fact, in the absence of transmission noise affecting the timing of the zero crossings of the modulated received signal, and so the duration of at least one half-cycle, the absolute value of the relationship R remains less than a limiting value calculated, physically to reflect the fact that modulation is a cumulative procedure, so the derivative with respect to time of the received version of the modulating signal remains less than a moderate value.

This first approach, which requires the establishment of a precise enough method of timing and the calculation of the absolute value of the relationship R, is rather costly in technical terms.

On the other hand, it shows fairly low sensitivity to the detection of transmission noise corresponding to short term phase jumps.

The second known detection technique consists of controlling the frequency spectrum of the received and demodulated signal. In fact after a complete demodulation, the received signal consists only of the modulated signal carrying transmission information on which there may be superimposed possible transmission noise. In accordance with this second detection technique, therefore the received demodulated signal is subjected to narrow band filtering rejecting the modulated signal (58 Hz or 60 Hz) and the background noise level is monitored. Too high a level corresponds to an unacceptable level of transmission noise.

This second method which requires the provision of an accurate narrow band filter with strong attenuation encounters difficulties of realisation in practice for a satisfactory final result.

Against this background the present invention has an objective the provision of a method and apparatus for the detection of transmission noise which can be made to work simply.

The method of the invention is characterised in that it comprises a step consisting essentially of detecting in the frequency bandwidth of the modulated received signal, the presence of components of frequency less than the lowest frequency of the modulated transmitted signal, the presence of such frequencies being attributed to the presence to transmission noise.

This detection step is preferably preceded by a step of conditioning the modulated received signal to limit the amplitude variations of the signal to rapid transitions between two levels equidistant from zero.

The detection comprises of band-pass or low-pass filtering of the modulated received signal, rejecting frequencies greater than an upper frequency chosen to be preferably less than half the lowest frequency of the modulated transmitted signal.

The apparatus of the invention consists of a band-pass or low-pass filter receiving the modulated received signal, preferably after the conditioning of the signal in a shaping circuit which provides a modulated signal having only two amplitude levels and sharp transitions.

The filter used is preferably a Butterworth filter the output of which is connected to one of two inputs of at least one comparator; this comparator, which receives a reference signal at its other input, provides a signal indicative of transmission noise when the amplitude of the filter output signal is, in absolute value, greater than that of the reference signal.

An embodiment of the invention will now be described by way of non-limitative example and with reference to the accompanying drawings, of which:

Figure 1:
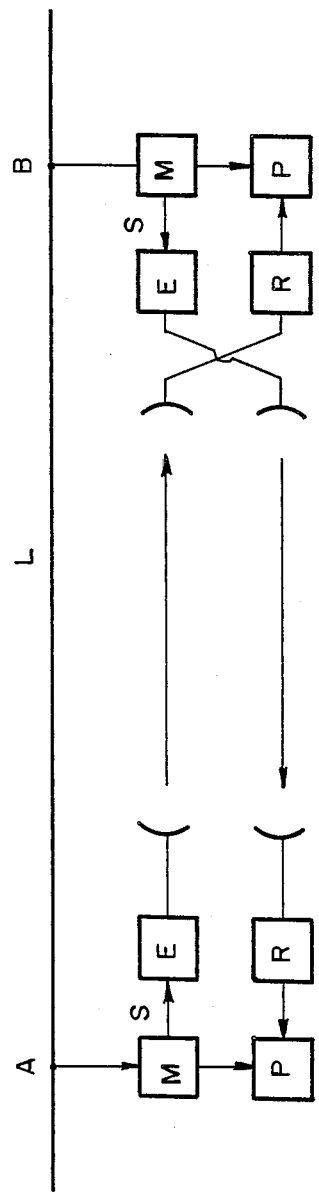
FIG. 1 is a general view of a differential protection system for a high voltage line.

The present invention is generally concerned with information transmission in differential protection systems such as that which is illustrated in FIG. 1.

This figure represents a high voltage line L protection of which is provided between points A and B.

At each of the points A and B measurement transformers are placed, generically designed by M, a protection circuit P a transmitter E and a receiver R.

The measurement transformers M, at point A for example, function to produce signals representative of line voltages and currents of the line L at point A or any other information relevant to the protection of the line.

This data is on the one hand transmitted directly to the protection circuit from point A, and on the other hand transmitted to the protection circuit P from point B through the agency of a transmitter E situated at point A and a receiver situated at point B.

The arrangement being completely symmetrical for Points A and B, protection circuits P situated at each end receive relevant information relating to the end of the line at which they are situated and information relating to the other end of the line.

Protection circuits P may thus detect, by comparing information which they receive from each end of the line L, possible faults affecting the line.

Figure 2:
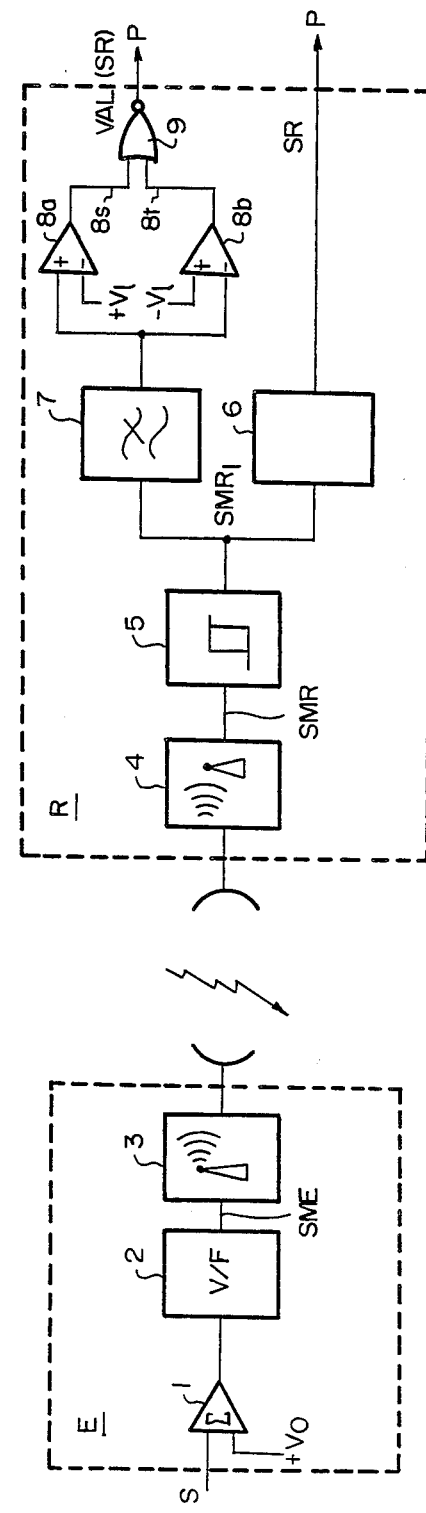
FIG. 2 is a view of an information transmission system, for such a differential protection system, of which the receiver uses the principle of the invention.

However, as shown in FIG. 2 by an arrow, it is possible that information coming from the end of the line furthese from the protection circuit P may be corrupted by noise affecting the transmission of the information from transmitter E to receiver R. There is then a danger that this noise could be interpreted by the detection circuit P as a fault on the line L.

Against this background, the invention aims to detect transmission noise, in order to avoid untimely release of the protection circuits P.

The transmitter E of FIG. 2 receives a signal S for transmission, representing data relevant to protection, such as the value of voltage or current on the line, provided by one of the transformers M.

This signal S is added, in summing amplifier 1, to a known polarising voltage $V_o$ selected such that the output of the adder 1 maintains constant polarity and may directly control a voltage to frequency converter 2.

The output signal of converter 2, which represents the modulated transmitted signal SME, is connected to a transmission circuit 3 which sends, by wireless for example, the signal to a relaying circuit 4 of a receiver R. The modulated received signal, available at the output circuit 4, is designated SMR to emphasis that it may be different from the modulated transmitted signals SME.

Figure 3:
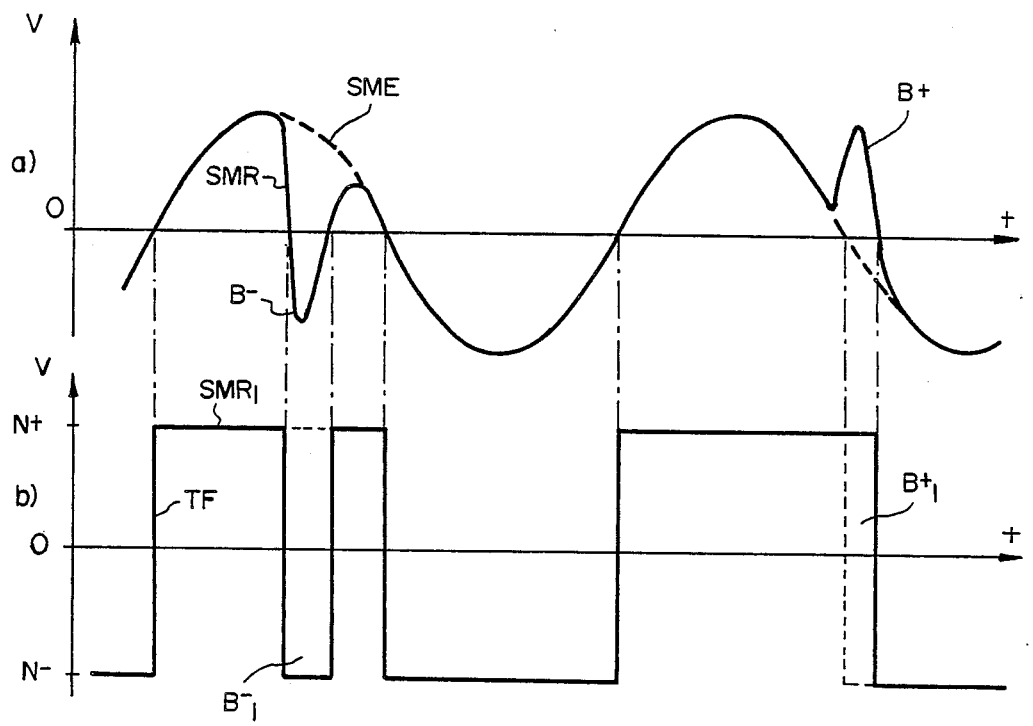
FIGS. 3a and 3b represent, before and after shaping respectively, a modulated received signal affected by transmission noise.

FIG. 3a represents as a function of time the amplitude V of modulated transmitted signal SME and modulated received signal SMR, for the case where transmission noise adding a negative component (B$^-$) or a positive component (B$^+$) has corrupted the transmitted signal during transmission. It will be noted in particular that the zero crossings of signals SME and SMR are different.

The receiver comprises a bistable circuit 5 (Schmitt trigger) receiving the modulated received signal SMR and delivering a shaped modulated signal, SMR$_1$ the amplitude variations of which are limited to sharp transitions TF between two amplitude levels N$^+$ and N$^-$ equidistant from zero. If the signal SMR is of positive polarity, the shaped signal SMR$_1$ is at the positive level N$^+$, and if the signal SMR has a negative polarity, the shaped signal SMR$_1$ is at the negative level N$^-$.

The modulated received and shaped signal SMR$_1$ is connected to a demodulator 6 which provides at its output a reconstituted signal SR.

Such demodulators will be well known to a man skilled in the art, such that a detailed description of them is not required. They may consist for example of a voltage-to-frequency converter giving a signal comprising DC and AC components and which after removal of its DC component constitutes the demodulated signal SR.

In the absence of transmission noise, the reconstituted signal SR is a faithfull reproduction of the modulating signal S from which the modulated signal SME has been derived, and may therefore be used by protection circuit P.

Figure 4:
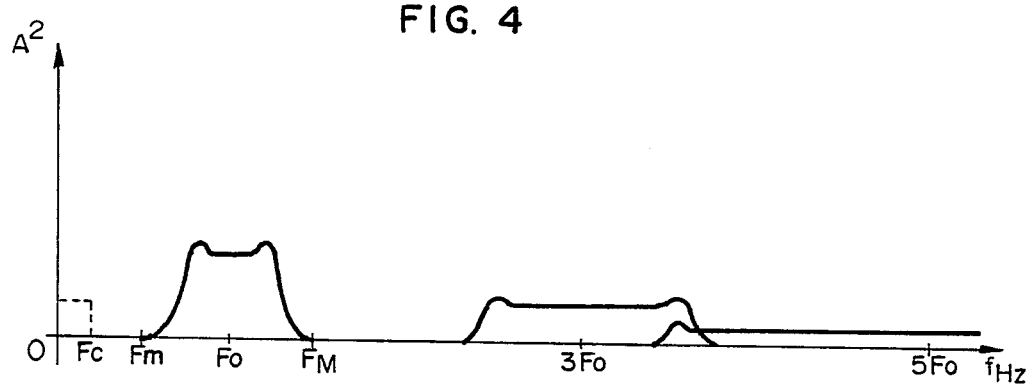
FIG. 4 represents the frequency spectrum of a modulated received signal (after shaping), without transmission noise.

Furthermore, in the absence of transmission noise the shaped signal SMR$_1$ has a frequency spectrum of the type illustrated in FIG. 4.

In this figure, $F_o$ represents the carrier wave frequency, that is the frequency taken by the modulated signal SME when the modulatingsignal S is zero and which is due to frequency conversion of the polarising voltage $V_o$.

Classically, the signal S is a sinusoid, and the frequency of the transmitted modulated signal SME is of the form $F_o + K.V(S)$ where K is a constant and where V(S) represents the instantaneous value positive or negative of signal S; such that the frequency of the modulated emitted signal SME lies between a minimum frequency:

$$F_m = F_o - K.|V_{MAX}(S)|$$

and a maximum frequency:

$$F_M = F_o + K.|V_{MAX}(S)|$$

where $|V_{MAX}(S)|$ represents the absolute maximum amplitude value of signal S.

Such a frequency characteristic is shown, in FIG. 4 in the frequency spectrum of shaped signal SMR$_1$, which demonstrates frequency components in the band Fm-FM centered on carrier wave frequency $F_o$.

FIG. 4 shows equally well the components in bands centered on odd frequencies 3 $F_o$, 5 $F_o$, these components being however, only due to the shaping, by circuit 5, of the directly received signal SMR.

The invention essentially lies in the discovery and use of the fact that in the presence of burst transmission noise, the spectrum of the signal SMR$_1$ represented in FIG. 4 contains frequency components of relatively great amplitude in a band included between zero and the minimum frequency Fm of the modulated emitted signal, whilst in the absence of transmission noise this spectrum is without low frequency components of significant amplitude, even if the modulated received signal SMR$_1$ is carrying irregularities showing a line fault.

Thus, in the specific embodiment of FIG. 2, transmission noise is detected by means of a low-pass or band-pass fifth order Butterworth filter, 7, receiving the shaped modulated signal SMR$_1$.

In the absence of noise, such as B$^-$ and B$^+$, giving rise to a shaped noise such as B$_1^-$ and B$_1^+$, the filter 7 does not produce any significant signal at its output as long as the high frequency cut-off $F_c$ of the filter is less than the minimum frequency $F_m$.

In the presence of noise B$_1^-$ or B$_1^+$ of significant duration, the filter 7 provides an output signal capable of being detected under suitable conditions, and corresponding to the filter step response.

Although the filter 7 may receive directly the modulated received signal SMR, it is very advantageous to arrange for the filter to receive the shaped modulated signal SMR$_1$.

In fact, noise energy such as B$^+$ affecting the zero crossing of signal SMR is different, for a given duration, according to whether the noise appears in the region of the zero crossing of of the signal SMR or in the region of the maximum amplitude of the signal. By contrast, the energy of noise such as B+ affecting the signal $SMR_1$ is identical, for a given duration, whatever the instant that the noise appears. The bistable shaping circuit 5 therefore fulfils the function, when placed before the filter 7, of noise energy normalisation leading to better detection.

In practice, the upper cut-off frequency $F_c$ of the filter is chosen preferably to be less than half the minimum frequency $F_m$ such that the background signal provided by the filter in the absence of noise is of a very low level, for example of absolute value less than a threshold value $V_1$.

Where a band-pass filter is used, the lower cut-off frequency of the filter is chosen to be close to zero, for example of the order of twenty Hertz, such that the filter output may be suitably activated by detection of frequencies within a wide enough band of frequencies.

A step response of filter 7, indicative of the presence of transmission noise is, for example, detected by comparing, in two comparators respectively 8a and 8b, the output signal of filter 7 with the positive threshold $+V_1$ and the negative threshold $-V_1$.

If the output signal of of filter 7 starts to exceed the positive threshold level $+V_1$, the output signal 8s of comparator 8a, initially at a logic state "0", changes to logic state "1".

In the same way, if the output signal of filter 7 is less than the negative threshold level $-V_1$, the output signal of 8t of comparator 8b, initially at logic state "0" changes to logic state "1".

Comparators 8a and 8b are connected to inputs of a NOR gate 9 which provides a validation signal VAL(SR) of decoded signal SR, the validation signal being at logic state "1" in the absence of noise, and at logic state "0" in the presence of noise.

Signal VAL(SR) is transmitted to protection circuit P, similarly to signal SR, and controls circuit P to take no action in response to signal SR at the instants when the latter purports corruption by transmission noise.

In a preferred embodiment, given solely by way of example, the various parameters involved may take the following values:

Carrier frequency: 1900 Hz
Minimum frequency $F_m$: 1000 Hz
Maximum frequency $F_M$: 2800 Hz
Filter 7: Bandpass 5th order Butterworth
Cut off frequency $F_c$: 350 Hz
Detection Threshold $V_1$: $16.10^{-3}.N+$
Frequency S: 50 Hz These values allow the detection of noise such as $B_1$ or $B_1$ of duration greater than or equal to 20 microseconds.

I claim:

1. In a method for the regulation of a signal transmitted from a transmitter to a receiver in a differential protection system for a protected electrical installation, the transmitted signal taking the form of a modulated signal resulting from frequency or pulse width modulation of a carrier wave, said a signal representing required information to be transmitted, the method for identifying the presence of transmission noise in the received signal, in order to distinguish such noise from information, which may be carried by this signal, relating to a possible fault in the protected installation, comprising the steps of detecting in the frequency bandwidth of the modulated received signal (SMR), the presence of frequency components of the received signal which are less than the lowest frequency ($F_m$) of the modulated transmitted signal (SME), the presence of such frequencies being attributed to the presence of transmission noise.

2. A method according to claim 1 characterised in that said detection operation is preceded by a step of conditioning the modulated received signal (SMR) to limit the amplitude variations of the modulated received signal to rapid transitions (TF) between two levels (N+, N−) equidistant from zero.

3. A method according to claim 1, characterised in that the detection operation comprises low-pass filtering of the modulated received signal, with a cut-off frequency ($F_c$) less than half the lowest frequency of the modulated transmitted signal.

4. In a differential protection system for an electrical installation which includes a signal transmitted from a transmitter to a receiver in said system, the transmitted signal taking the form of a modulated signal resulting from frequency or pulse width modulation of a carrier wave by means of a signal representing required information which is to be transmitted (5) which may indicate a fault in said protected electrical installation, the receiver including detecting means for identifying the presence of transmission noise in the received signal which relates to a possible fault in the system, said detecting means including a low-pass filter or a bandpass filter (7) for receiving the modulated received signal which has an upper cut-off frequency (Fc) less than the minimum frequency of the modulated transmitted signal, the presence of such frequencies at the output of said low-pass filter or band-pass filter (7) being attributed to the presence of transmission noise.

5. Apparatus according to claim 4 characterised in that it comprises a shaping circuit (5) directly receiving the modulated received signal and providing to the low-pass or band-pass filter a signal modulated on two levels with fast transitions.

6. Apparatus according to claim 4 characterised in that the filter (7) is a Butterworth filter.

7. Apparatus according to claim 4, characterised in that it comprises a comparator (8a) connected to the filter output, for receiving a reference signal ($V_1$), and providing a signal (8s) indicative of transmission noise when the amplitude of the output signal of the filter (7) is, in absolute value, greater than the reference signal ($V_1$).

8. In a differential protection system for a protected electrical installation which includes a signal transmitted by a transmitter and a signal received by a receiver in said system, the transmitted signal taking the form of a modulated signal resulting from frequency or pulse width modulation of a carrier wave by means of a signal representing required information which is to be transmitted (5) and which may indicate a fault in said protected electrical installation, the received signal possibly differing from the transmitted signal by the presence of transmission noise in the received signal, the receiver including detecting means for identifying the presence of such transmission noise in the received signal said detecting means including a low-pass filter or a bandpass filter (7) for receiving the modulated received signal which filter has an upper cut-off frequency (Fc) less than the minimum frequency of the modulated transmitted signal, the presence of frequencies less than said minimum frequency at the output of said low-pass filter or band-pass filter (7) being attributed to the presence of transmission noise.

* * * * *